United States Patent
Katayama et al.

(10) Patent No.: US 11,772,676 B2
(45) Date of Patent: Oct. 3, 2023

(54) DRIVING SUPPORT DEVICE

(71) Applicant: HONDA MOTOR CO., LTD., Tokyo (JP)

(72) Inventors: Makoto Katayama, Saitama (JP); Hirokazu Tokushima, Tokyo (JP); Osamu Ito, Saitama (JP); Hideo Kadowaki, Tokyo (JP); Hiroki Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 17/583,200

(22) Filed: Jan. 25, 2022

(65) Prior Publication Data

US 2022/0242437 A1 Aug. 4, 2022

(30) Foreign Application Priority Data

Feb. 3, 2021 (JP) .................. 2021-015843

(51) Int. Cl.
*B60W 50/16* (2020.01)
*B60W 50/02* (2012.01)
(Continued)

(52) U.S. Cl.
CPC ............ *B60W 50/16* (2013.01); *B60W 40/04* (2013.01); *B60W 50/0205* (2013.01);
(Continued)

(58) Field of Classification Search
CPC .. B60W 50/16; B60W 40/04; B60W 50/0205; B60W 2050/0215;
(Continued)

(56) References Cited

U.S. PATENT DOCUMENTS 10,507,827 B2 * 12/2019 Gesch ................. B60W 30/095
2009/0243912 A1 * 10/2009 Lohmeier ............ G01S 13/931
342/70
(Continued)

FOREIGN PATENT DOCUMENTS

DE 102013206707 A1 10/2014
DE 102015220355 A1 4/2017
(Continued)

OTHER PUBLICATIONS

Office Action issued in the DE Patent Application No. 102022101435.5, dated May 4, 2023.

*Primary Examiner* — Daryl C Pope
(74) *Attorney, Agent, or Firm* — CKC & Partners Co., LLC (57) ABSTRACT

The present disclosure provides a driving support device which can notify a driver of the existence of other vehicles, even in a case of a function of detecting the existence of the other vehicle temporarily not being useable. A driving support device 11 includes: a second vehicle detection unit 204 which detects the other vehicle existing behind or ahead of the vehicle 1, based on the captured image, in a case of the vehicle detection function being determined as not normally operating, in which the notification control unit 202 notifies the driver of the vehicle 1 of existence of the other vehicle, in a case of detecting the other vehicle by way of the second vehicle detection unit 204.

3 Claims, 4 Drawing Sheets (51) Int. Cl.
*B60W 40/04* (2006.01)
*G06V 20/58* (2022.01)
*G01S 13/931* (2020.01)
*G01S 17/931* (2020.01)
*B60W 50/14* (2020.01)

(52) U.S. Cl.
CPC .......... *G01S 13/931* (2013.01); *G01S 17/931* (2020.01); *G06V 20/58* (2022.01); *B60W 2050/0215* (2013.01); *B60W 2050/143* (2013.01); *B60W 2050/146* (2013.01); *B60W 2420/52* (2013.01); *G01S 2013/9315* (2020.01)

(58) Field of Classification Search
CPC ..... B60W 2050/143; B60W 2050/146; B60W 2420/52; B60W 2050/0292; B60W 2554/00; B60W 50/029; B60W 2420/42; B60W 50/14; B60W 60/0027; G01S 13/931; G01S 17/931; G01S 2013/9315; G01S 13/865; G01S 13/867; G01S 17/86; G06V 20/58
See application file for complete search history.

(56) References Cited

U.S. PATENT DOCUMENTS

| | | |
|---|---|---|
| 2015/0217765 A1 | 8/2015 | Tokoro |
| 2015/0304649 A1 | 10/2015 | Hoffmann et al. |
| 2018/0297609 A1 | 10/2018 | Bozsik |
| 2020/0331484 A1* | 10/2020 | Rodriguez Bravo .. G07C 5/008 |
| 2020/0333439 A1* | 10/2020 | Mahajan ................ G01S 7/4802 |
| 2021/0284140 A1 | 9/2021 | Hayakawa et al. |
| 2022/0176917 A1* | 6/2022 | Phinisee ................ H04N 7/183 |

FOREIGN PATENT DOCUMENTS

| | | |
|---|---|---|
| DE | 102017006260 A1 | 1/2018 |
| JP | 2015130098 A | 7/2015 |
| JP | 2015148899 A | 8/2015 |
| JP | 2020090145 A | 6/2020 |

* cited by examiner

DRIVING SUPPORT DEVICE

This application is based on and claims the benefit of priority from Japanese Patent Application No. 2021-015843, filed on 3 Feb. 2021, the content of which is incorporated herein by reference.

BACKGROUND OF THE INVENTION

Field of the Invention

The present invention relates to a driving support device.

Related Art

Conventionally, a function has been known of detecting other vehicles traveling behind and ahead of one's own vehicle using a sensor such as millimetric wave radar, and notifying a driver of one's own vehicle (for example, refer to Patent Document 1).

Patent Document 1: Japanese Unexamined Patent Application, Publication No. 2015-130098

SUMMARY OF THE INVENTION

However, in the case of a sensor being blocked by another vehicle due to congestion, etc., or the sensor of their own vehicle and the sensor of the other vehicle temporarily interfering, there is a possibility of the function of detecting the existence of the other vehicle using sensors not normally operating, and appropriate notification to the driver of their own vehicle not being possible.

Therefore, the present invention has an object of providing a driving support device which can notify the driver of the existence of another vehicle, even in a case of a function of detecting the existence of other vehicles temporarily not being useable.

A driving support device (for example, the driving support device 11 described later) according to an aspect of the present disclosure includes: a peripheral information acquisition unit (for example, the peripheral information acquisition unit 40 described later) which acquires peripheral information of surroundings of a vehicle (for example, the vehicle 1 described later); a captured image acquisition unit (for example, the camera 41 described later) which acquires a captured image of surroundings of the vehicle; a first vehicle detection unit (for example, the first vehicle detection unit 201 described later) which detects another vehicle (for example, the other vehicles 100a to 100e described later) existing behind or ahead of the vehicle based on the peripheral information; a notification control unit (for example, the notification control unit 202 described later) which notifies a driver of the vehicle of existence of the other vehicle, in a case of detecting the other vehicle by way of the first vehicle detection unit; an operation determination unit (for example, the operation determination unit 203 described later) which determines whether a vehicle detection function of detecting the other vehicle by way of the first vehicle detection unit is normally operating based on the peripheral information; and a second vehicle detection unit (for example, the second vehicle detection unit 204 described later) which detects the other vehicle existing behind or ahead of the vehicle, based on the captured image, in a case of the vehicle detection function being determined as not normally operating, in which the notification control unit notifies the driver of the vehicle of existence of the other vehicle, in a case of detecting the other vehicle by way of the second vehicle detection unit.

In addition, the operation determination unit determines whether the vehicle detection function of detecting the other vehicle of the first vehicle detection unit is normally operating, based on the peripheral information and the captured image.

Furthermore, the peripheral information acquisition unit includes millimetric wave radar (for example, the millimetric wave radar 43 described later) or light detection and ranging (for example, the LiDAR 42 described later).

According to the present invention, it is possible to provide a driving support device which can notify a driver of the existence of another vehicle, even in a case of a function of detecting the existence of other vehicles temporarily not being useable.

DETAILED DESCRIPTION OF THE INVENTION

Figure 1:
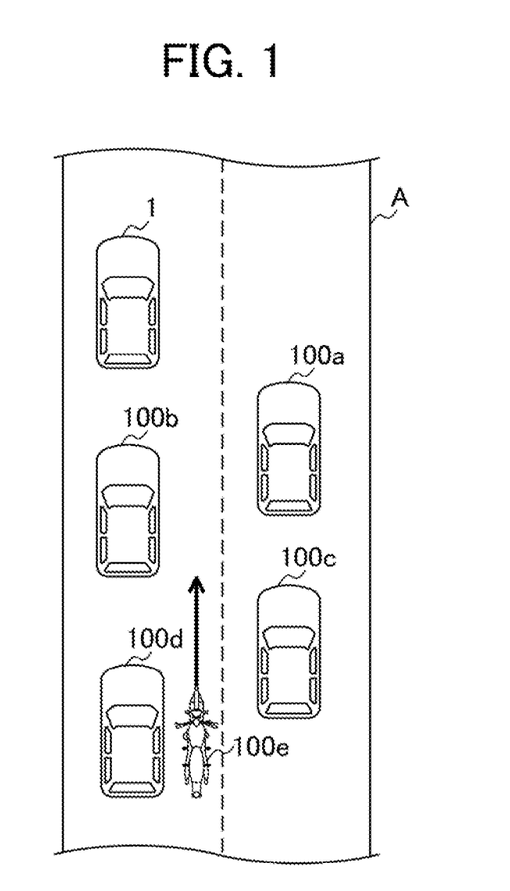
FIG. 1 is a view showing an example of a use condition of a vehicle according to the present embodiment.

Hereinafter, an embodiment of a driving support device of the present invention will be explained by referencing the drawings. FIG. 1 is a view showing an example of a use condition of the vehicle 1 according to the present embodiment. As shown in FIG. 1, the vehicle 1 is a four-wheeled passenger car of sedan type, for example, and travels on a road A. In the road A, other vehicles 100a to 100e travel in the periphery of the vehicle 1.

The vehicle 1 has a function of detecting other vehicles traveling behind and ahead of the vehicle 1 by the millimetric wave radar, etc., and notifying the drive of the vehicle 1 of the existence of the other vehicles detected (Blind Spot Information (BSI) function).

However, during a traffic jam occurrence, since the inter-vehicle distance between the vehicle 1 and other vehicles 100a to 100e becomes narrower, there is a possibility of the millimetric wave radar, etc. of the vehicle 1 being blocked by the other vehicles 100a to 100e or temporarily interfering with the radar of the other vehicles 100a to 100e. In such a case, the vehicle 1 cannot appropriately operate the function of detecting the existence of the other vehicles 100a to 100e. The vehicle 1 according to the present embodiment has a function for causing the function of detecting the existence of other vehicles to appropriately operate, even in the above such situations, as illustrated below.

Figure 2:
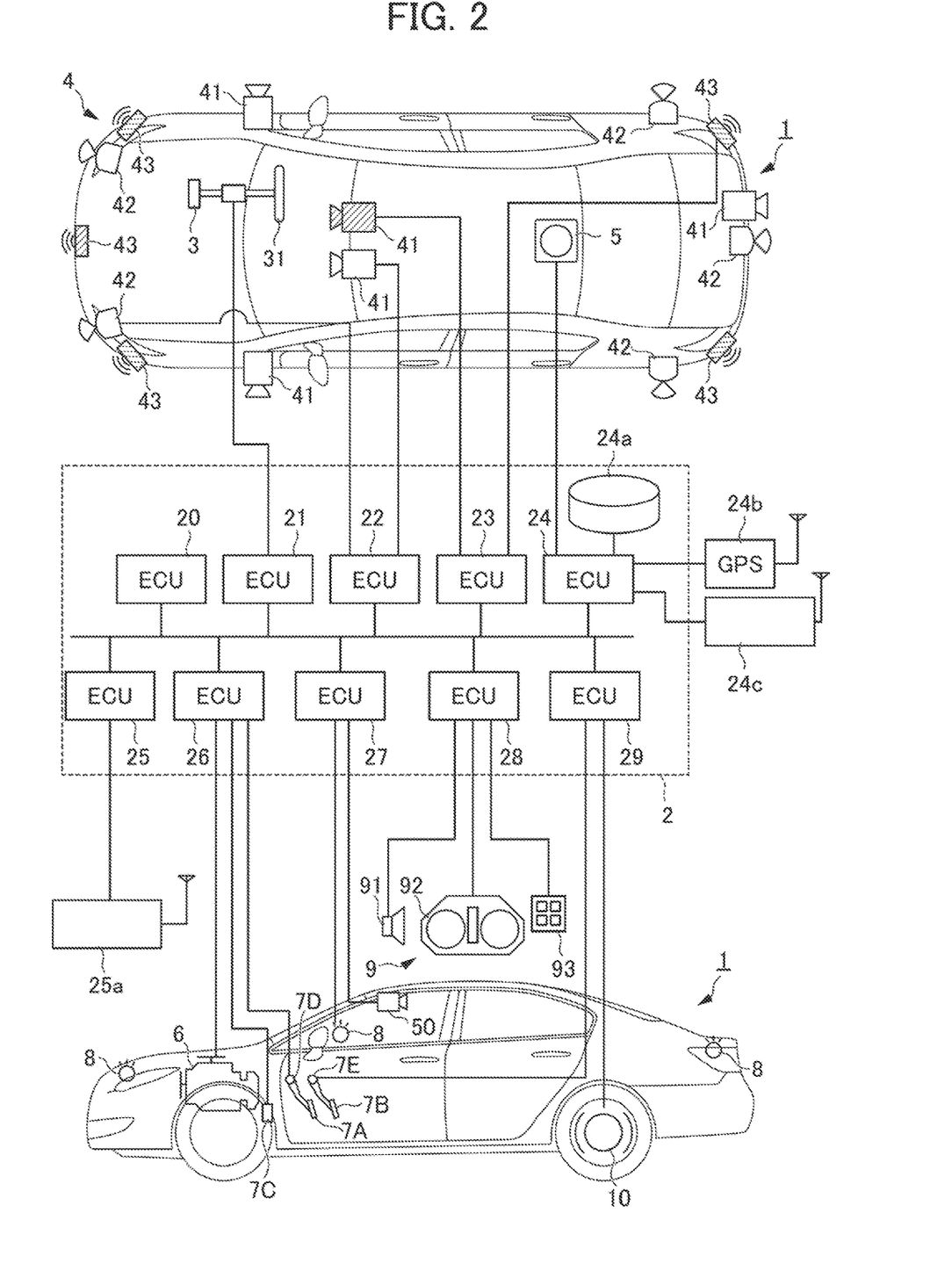
FIG. 2 is a block diagram showing the configuration of a vehicle according to the present embodiment.

FIG. 2 is a block diagram showing the configuration of a vehicle 1 according to the present embodiment. FIG. 2 shows an output of the vehicle 1 combining a plan view and a side view. The vehicle 1 is a four-wheeled passenger car of sedan type as one example.

The vehicle 1 includes a control device 2. The control device 2 includes a plurality of ECUs (automatic driving ECU 20 to stop control ECU 29) connected to enable transmitting by way of an onboard network. Each ECU functions as a computer including a processor of which a CPU is representative, a storage device such as semiconductor memory, an interface such as an external device, etc. The storage device, program executed by a processor, and data used in processing by the processor, etc. are stored. Each ECU may include a plurality of processors, storage devices, interfaces, etc.

Hereinafter, the function of each automatic operation ECU 20 to stop control ECU 29, etc. will be explained. It should be noted that the number of ECUs and corresponding functions can be set appropriately, and can be subdivided or integrated more than the ECUs shown in the present embodiment.

The automatic operation ECU 20 executes control for automatic operation of the vehicle 1. In automatic operation, at least one of steering of the vehicle 1, or acceleration and deceleration is automatically controlled.

A steering ECU 21 controls an electric power steering device 3. The electric power steering device 3 includes a mechanism which steers front wheels in response to a driving operation (steering operation) of the driver on a steering wheel 31. In addition, the electric power steering device 3 includes a motor which exerts a driving force for assisting a steering operation or automatically steering the front wheels; a sensor detecting the steering angle; etc. In the case of the driving state of the vehicle 1 being automatic operation, the steering ECU 21 automatically controls the electric power steering device 3 in response to the instruction from the automatic operation ECU 20, and controls the travel direction of the vehicle 1.

Travel support ECUs 22 and 23 perform control of a camera 41, LIDAR 42 and millimetric wave radar 43, which detect the ambient conditions of the vehicle, and information processing of detection results. The camera 41 images the front, sides and rear of the vehicle 1. In the case of the present embodiment, two of the cameras 41 are provided at the front of the vehicle 1, and one is provided to each side and the rear. The travel support ECUs 22 and 23 can extract an outline of a target, and extract dividing lines of lanes on a road (white lines, etc.), by analysis of the images captured by the camera 41.

The LIDAR 42 is Light Detection and Ranging (LIDAR), detects landmarks of the surroundings of the vehicle 1, and measures the distance from landmarks. In the case of the present embodiment, five LIDAR 42 are provided, one being provided to each corner at the front of the vehicle 1, one at the center in the rear, and one at each side in the rear.

The millimetric wave radar 43 detects landmarks of the surroundings of the vehicle 1, and measures the distance from the landmarks. In the case of the present embodiment, five millimetric wave radar 43 are provided, one being provided at the center in the front of the vehicle 1, one at each corner in the front, and one provided at each corner in the rear.

The travel support ECU 22 performs control of one camera 41 in the front of the vehicle 1 and each LIDAR 42, and information processing of detection results. The travel support ECU 23 performs control of another camera 41 in the front of the vehicle 1 and each millimetric wave radar 43, and information processing of detection results. It is possible to improve the reliability of detection results by equipping two groups of ECUs detecting the ambient conditions of the vehicle 1, and it is possible to perform multi-faceted analysis of the surrounding environment of the vehicle 1, by equipping detection units of different types such as the camera 41, LIDAR 42 and millimetric wave radar 43.

A position recognition ECU 24 performs controls of a gyro sensor 5, GPS sensor 24b and communication device 24c, and performs information processing of detection results or communication results. The gyro sensor 5 detects gyration of the vehicle 1. The position recognition ECU 24 can determine the route of the vehicle 1, according to the detection results of the gyro sensor 5, wheel speed, etc.

The GPS sensor 24b detects the current position of the vehicle 1. The communication device 24c performs wireless communication with a server that provides map information, traffic information, etc. The position recognition ECU 24 can access a database 24a of map information constructed in the storage device, and the position recognition ECU 24 performs route guidance from a current location to a destination, etc.

The communication control ECU 25 includes a communication device 25a for inter-vehicle communication. The communication device 25a performs wireless communication with other vehicles in the surroundings, and performs information exchange between vehicles.

The drive control ECU 26 controls a power plant 6. The power plant 6 is a mechanism which outputs driving force causing the drive wheels of the vehicle 1 to rotate, and includes an engine and transmission, for example. The drive control ECU 26, for example, controls the output of the engine in response to driving operation (acceleration operation or acceleration operation) of the driver detected by an operation detection sensor 7D provided to the accelerator pedal 7A. Then, the drive control ECU 26 switches the variable speed level of the transmission based on information of the vehicle speed, etc. detected by the vehicle speed sensor 7C. In the case of the driving state of the vehicle 1 being automatic driving, the drive control ECU 26 automatically controls the power plant 6 in response to the instruction from the automatic driving ECU 20, and controls acceleration/deceleration of the vehicle 1.

A vehicle external notification control ECU 27 controls a lighting unit (headlights, taillights, etc.) including directional indicators 8 (winkers). In the case of the example of FIG. 1, the directional indicators 8 are provided at the front, door mirrors, and rear of the vehicle 1.

A vehicle internal notification control ECU 28 performs control of an input/output device 9. The input/output device 9 performs output of information to the driver, and reception of inputs of information from the driver. The input/output device 9 has a voice output device 91, display device 92 and input device 93.

The voice output device 91 notifies information by voice to the driver. The display device 92 notifies information by the display of images to the driver. The display device 92 is arranged in front of the driver's seat, and configures an instrument panel, etc. It should be noted that the input/output device 9 is exemplified by the output of voice and display of images; however, it may notify of information by vibration or light.

In addition, the input/output device 9 may notify information by combining a plurality of voice, display, vibration or light. Furthermore, the input/output device 9 may differentiate the combinations according to the level of information to notify (for example, urgency), and differentiate the notification mode.

The input device 93 is arranged at a position allowing operation by the driver, and is a switch group for performing instruction to the vehicle 1; however, it may include a voice input device.

The stop control ECU 29 controls the brake device 10 and parking brake (not shown). The brake device 10 is a disc brake device, for example, is provided to each wheel of the vehicle 1, and causes the vehicle 1 to decelerate or stop by applying resistance to rotation of the wheels.

The stop control ECU 29, for example, controls operation of the brake device 10 in response to a driving operation (brake operation) of the driver detected by an operation detection sensor 7E provided to the brake pedal 7B. In the case of the driving state of the vehicle 1 being automatic driving, the stop control ECU 29 automatically controls the brake device 10 in response to instruction from the ECU 20, and controls deceleration and stopping of the vehicle 1. The brake device 10 and parking brake can operate in order to maintain the stopped state of the vehicle 1. In addition, in the case of the transmission of the power plant 6 including a parking lock mechanism, this parking lock mechanism can operate in order to maintain the stopped state of the vehicle 1.

The vehicle 1 further includes a vehicle interior detection sensor 50 for detecting the state of the vehicle interior. Herein, the vehicle interior detection sensor 50 is configured from a camera as an imaging unit, a weight sensor, temperature detection sensor, etc., and the types thereof are not particularly limited. It should be noted that the vehicle interior detection sensor 50 may be provided to every seat provided in the vehicle 1, or may be provided in a single configuration such that can overlook and monitor the entire vehicle interior.

Figure 3:
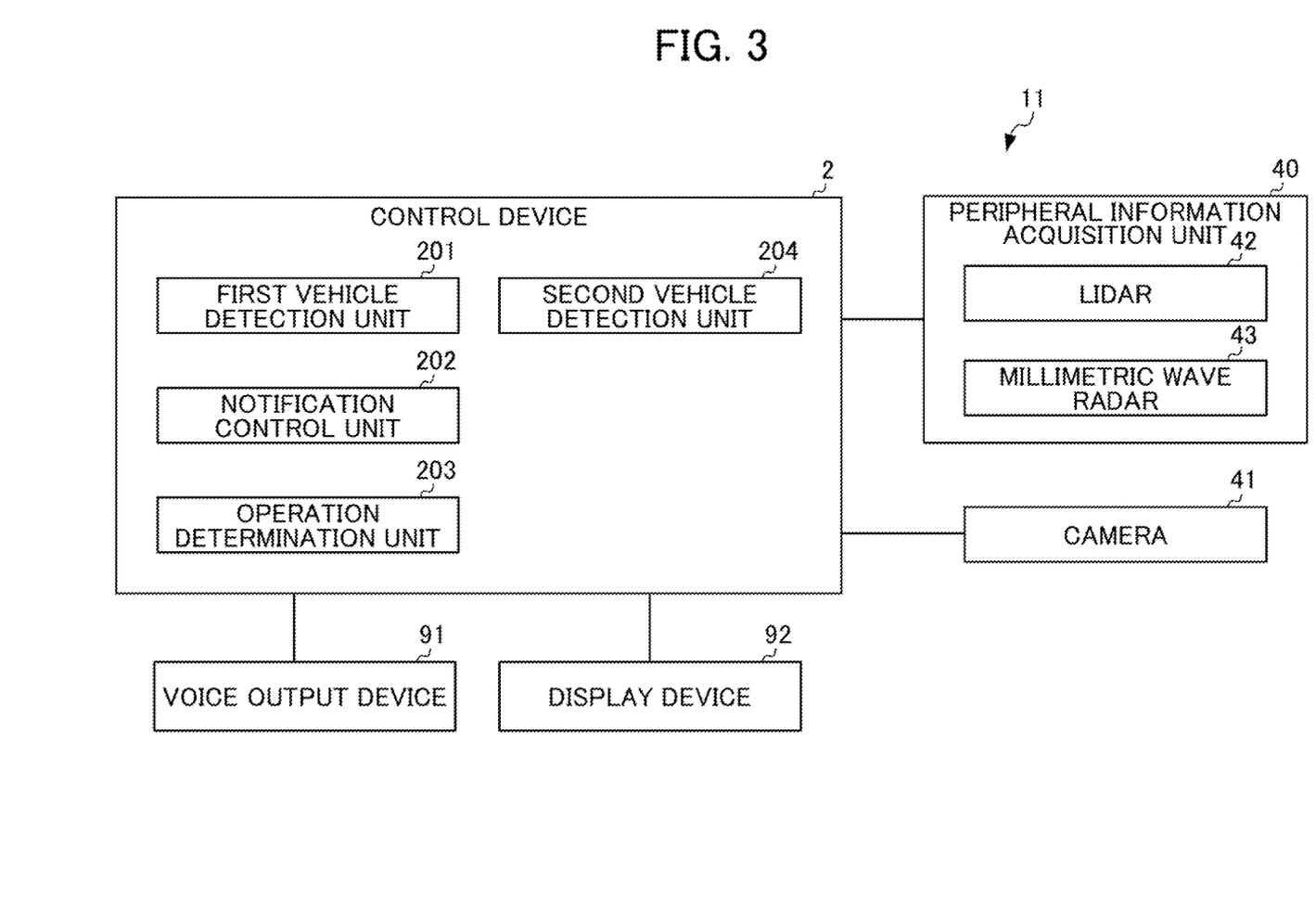
FIG. 3 is a view showing a functional configuration of a driving support device according to the present embodiment.

Hereinafter, processing of the driving support device 11 according to the present embodiment will be explained. FIG. 3 is a view showing a functional configuration of the driving support device 11 according to the present embodiment. As shown in FIG. 3, the driving support device 11 is realized by the constitutional elements of the aforementioned vehicle 1. In other words, the driving support device 11 includes the control device 2, voice output device 91, display device 92, peripheral information acquisition unit 40, and camera (captured image acquisition unit) 41.

The control device 2 includes a first vehicle detection unit 201, notification control unit 202, operation determination unit 203, and second vehicle detection unit 204. The peripheral information acquisition unit 40 includes the aforementioned LIDAR 42 and millimetric wave radar 43.

The peripheral information acquisition unit 40 acquires peripheral information of the vehicle 1 by radio waves. For example, the peripheral information acquisition unit 40 acquires peripheral information behind or ahead of the vehicle 1 for which it is difficult for the driver to see. The peripheral information, for example, is data of the periphery of the vehicle 1 acquired by the LIDAR 42 or millimetric wave radar 43. The camera 41 captures images of the surroundings of the vehicle 1 and acquires a captured image, as mentioned above.

The first vehicle detection unit 201 detects another vehicle existing behind or ahead of the vehicle 1, based on the peripheral information acquired by the peripheral information acquisition unit 40.

The notification control unit 202 notifies the driver of the vehicle 1 of the existence of another vehicle, in the case of detecting another vehicle by way of the first vehicle detection unit 201. More specifically, the notification control unit 202 notifies the driver of the vehicle 1, by displaying information indicating the existence of another vehicle on a display device 92. In addition, the notification control unit 202 may notify the driver of the vehicle 1, by outputted a voice indicating the existence of another car from a voice output device 91.

The vehicle 1 according to the present embodiment 1 realizes a function of detecting another vehicle traveling behind and ahead of the vehicle and notifying the driver of the vehicle 1 of the existence of other vehicles detected (BSI function), by way of the first vehicle detection unit 201 and notification control unit 202.

The operation determination unit 203 determines whether the vehicle detection function of detecting other vehicles by way of the first vehicle detection unit 201 is operating normally, based on the peripheral information acquired by the peripheral information acquisition unit 40.

For example, during a traffic jam occurrence, the LIDAR 42 or millimetric wave radar 43 of the peripheral information acquisition unit 40 may be blocked by other vehicles 100a to 100e, or temporarily interfere with the radar of other vehicles 100a to 100e.

In such a case, the LIDAR 42 or millimetric wave radar 43 of the peripheral information acquisition unit 40 cannot appropriately perform sending and receiving of radio waves. For this reason, the peripheral information acquisition unit 40 cannot normally acquire the peripheral information. Consequently, the operation determination unit 203 determines that the vehicle detection function is not operating normally, in the case of the peripheral information acquisition unit 40 not being able to normally acquire the peripheral information. In addition, the operation determination unit 203 determines that the vehicle detection function is operating normally, in the case of being able to normally acquire the peripheral information.

In addition, the operation determination unit 203 may determine whether the vehicle detection function of detecting other vehicles of the first vehicle detection unit 201 is normally operating, based on the peripheral information and captured images. For example, for the LIDAR 42 or millimetric wave radar 43 of the peripheral information acquisition unit 40, radio waves may hardly be emitted due to debris, snowfall, etc.

In such a case, the peripheral information acquisition unit 40 cannot normally acquire the peripheral information. In addition, the captured images which were captured by the camera 41 include images indicating that debris, snowfall, etc. adhered to the periphery of the peripheral information acquisition unit 40 of the vehicle 1.

Consequently, the operation determination unit 203 determines that the vehicle detection function is not normally operating, in the case of the peripheral information acquisition unit 40 not being able to normally acquire peripheral information, and the captured images including images indicating that debris, etc. has adhered to the peripheral of the peripheral information acquisition unit 40.

The second vehicle detection unit 204, in the case of being determined that the vehicle detection function is not normally operating, detects another vehicle existing behind or ahead of the vehicle 1, based on the captured images which were captured by the camera 41. Then, the notification control unit 202 notifies the driver of the vehicle 1 of the existence of another vehicle, in the case of detecting the other vehicle by way of the second vehicle detection unit 204. The mode of notifying of the existence of the other vehicle can employ the voice output device 91, display device 92, etc. as mentioned above.

It should be noted that the second vehicle detection unit 204 may detect other vehicles existing behind or ahead of the vehicle 1, based on captured images which were captured by the camera 41, in cases other than the case of being determined that the vehicle detection function is not normally operating. Then, the notification control unit 202 notifies the driver of the vehicle 1 of the existence of other vehicles, by displaying captured images on the display device 92, in the case of detecting the other vehicle by way of the second vehicle detection unit 204. The driving support device 11 can thereby notify the driver of the other vehicle, etc. existing behind or ahead of the vehicle 1, in place of a side mirror.

Figure 4:
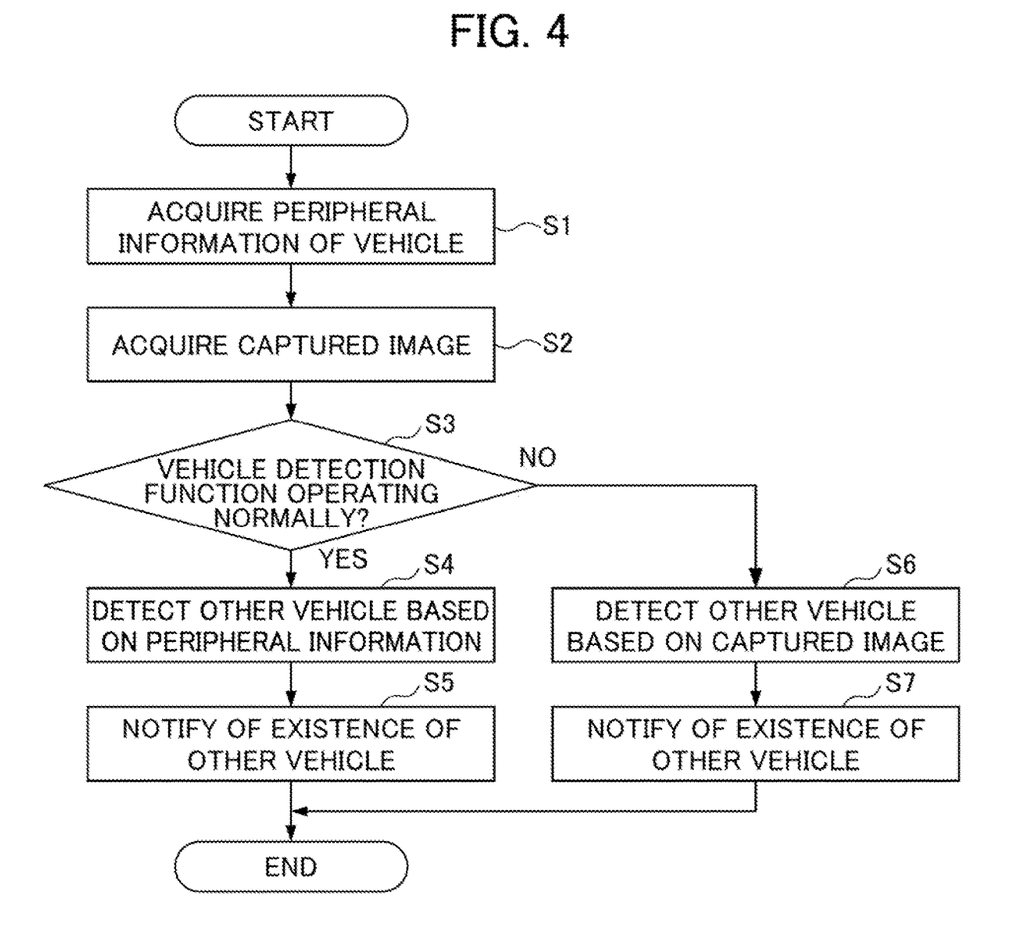
FIG. 4 is a flowchart showing processing of the driving support device according to the present embodiment.

FIG. 4 is a flowchart showing the processing of the driving support device 11 according to the present embodiment. In Step S1, the peripheral information acquisition unit 40 acquires peripheral information of the vehicle 1. In Step S2, the camera 41 acquires captured images of the surroundings of the vehicle 1.

In Step S3, the operation determination unit 203 determines whether the vehicle detection function of detecting other vehicles by way of the first vehicle detection unit 201 is normally operating, based on the peripheral information acquired by the peripheral information acquisition unit 40. In the case of the vehicle detection function normally operating (YES), the processing advances to Step S4. On the other hand, in the case of the vehicle detection function not normally operating (NO), the processing advances to Step S6.

In Step S4, the first vehicle detection unit 201 detects other vehicles existing behind or ahead of the vehicle 1, based on the peripheral information acquired by the peripheral information acquisition unit 40 in Step S1.

In Step S5, the notification control unit 202 notifies the driver of the vehicle 1 of the existence of other vehicles, in the case of detecting another vehicle by way of the first vehicle detection unit 201. In Step S6, the second vehicle detection unit 204 detects other vehicles existing behind or ahead of the vehicle 1, based on the captured images which were captured by the camera 41.

In Step S7, the notification control unit 202 notifies the driver of the vehicle 1 of the existence of other vehicles, in the case of detecting other vehicles by the second vehicle detection unit 204.

According to the present embodiment, the following effects are exerted, for example. The driving support device 11 according to the present embodiment includes: the peripheral information acquisition unit 40 which acquires peripheral information of surroundings of the vehicle 1; the camera 41 which acquires a captured image of surroundings of the vehicle 1; the first vehicle detection unit 201 which detects another vehicle existing behind or ahead of the vehicle 1 based on the peripheral information; the notification control unit 202 which notifies a driver of the vehicle 1 of existence of the other vehicle, in a case of detecting the other vehicle by way of the first vehicle detection unit 201; the operation determination unit 203 which determines whether a vehicle detection function of detecting the other vehicle by way of the first vehicle detection unit 201 is normally operating based on the peripheral information; and the second vehicle detection unit 204 which detects the other vehicle existing behind or ahead of the vehicle 1, based on the captured image, in a case of the vehicle detection function being determined as not normally operating, in which the notification control unit 202 notifies the driver of the vehicle 1 of existence of the other vehicle, in a case of detecting the other vehicle by way of the second vehicle detection unit 204.

The driving support device 11 can notify the driver of the existence of other vehicles using captured images from the camera 41, even in the case of the function of detecting the existence of the vehicles temporarily not being usable using the peripheral information acquisition unit 40.

In addition, the operation determination unit 203 determines whether the vehicle detection function of detecting other vehicles of the first vehicle detection unit 201 is normally operating, based on the peripheral information and captured images. The driving support device 11 can thereby determine operation of the vehicle detection function more accurately, due to determining whether the vehicle detection function is normally operating, using captured images together with peripheral information.

In addition, the peripheral information acquisition unit 40 of the driving support device 11 includes the LIDAR 42 or millimetric wave radar 43. The driving support device 11 can thereby realize a function of detecting other vehicles traveling behind and ahead of the vehicle 1 using the LIDAR 42 or millimetric wave radar 43, and notifying the driver of the vehicle 1 of the existence of the other vehicle thus detected.

Although an embodiment of the present invention has been explained above, the above-mentioned driving support device 11 can be realized by hardware, software or a combination of these. In addition, the control method performed by the above-mentioned driving support device 11 can also be realized by hardware, software or a combination of these. Herein, realized by software indicates the matter of being realized by a computer reading out and executing a program.

The programs can be stored using a variety of types of non-transitory computer readable media, and supplied to the computer. The non-transitory computer readable media includes varies types of tangible storage media. Examples of non-transitory computer readable media include magnetic media (for example, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although an embodiment of the present invention has been explained above, the present invention is not to be limited thereto. The configurations of detailed parts may be modified as appropriate within the scope of the gist of the present invention.

EXPLANATION OF REFERENCE NUMERALS 1 vehicle
11 driving support device
40 peripheral information acquisition unit
41 camera
201 first vehicle detection unit
202 notification control unit
203 operation determination unit
204 second vehicle detection unit

What is claimed is:
1. A driving support device comprising:
   a peripheral information acquisition unit which acquires peripheral information of surroundings of a vehicle;
   a captured image acquisition unit which acquires a captured image of surroundings of the vehicle;
   a first vehicle detection unit which detects another vehicle existing behind or ahead of the vehicle based on the peripheral information;
   a notification control unit which notifies a driver of the vehicle of existence of the other vehicle, in a case of detecting the other vehicle by way of the first vehicle detection unit;
   an operation determination unit which determines a vehicle detection function of detecting the other vehicle by way of the first vehicle detection unit is not normally operating, in the case of the peripheral information acquisition unit not being able to normally acquire the peripheral information as a result of the peripheral information acquisition unit is blocked by temporarily interfering with the peripheral information acquisition unit of other vehicles, and determines the vehicle detection function is normally operating, in the case of the peripheral information acquisition unit being able to normally acquire the peripheral information; and a second vehicle detection unit which detects the other vehicle existing behind or ahead of the vehicle, based on the captured image, in a case of the vehicle detection function being determined as not normally operating, wherein the notification control unit notifies the driver of the vehicle of existence of the other vehicle, by displaying information indicating the existence of another vehicle on a display device, or by outputted a voice indicating the existence of another car from a voice output device, in a case of detecting the other vehicle by way of the second vehicle detection unit.

2. The driving support device according to claim 1, wherein the operation determination unit determines whether the vehicle detection function of detecting the other vehicle of the first vehicle detection unit is normally operating, based on the peripheral information and the captured image.

3. The driving support device according to claim 1, wherein the peripheral information acquisition unit includes millimetric wave radar or light detection and ranging (LiDAR).

* * * * *